Dec. 24, 1968 E. M. TRIKILIS 3,418,613
METHOD OF MAGNETIZING A LARGE QUANTITY OF BULK ARTICLES
Filed March 2, 1966 3 Sheets-Sheet 1
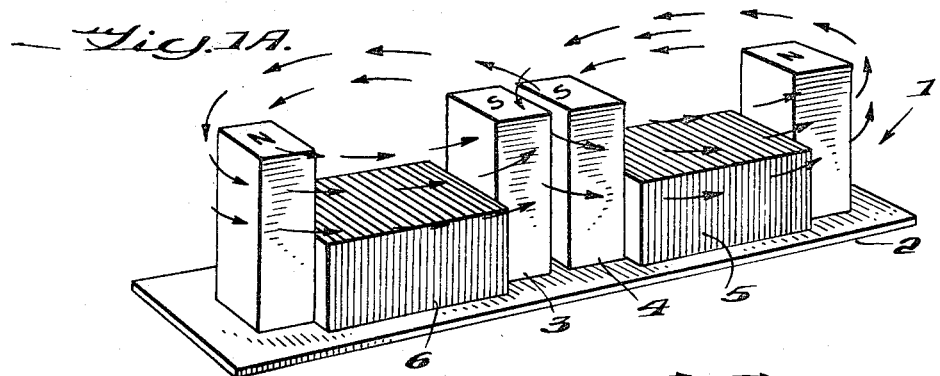
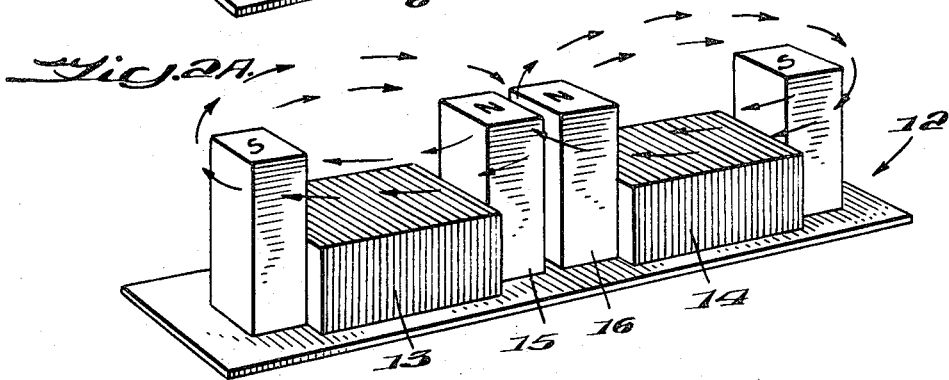
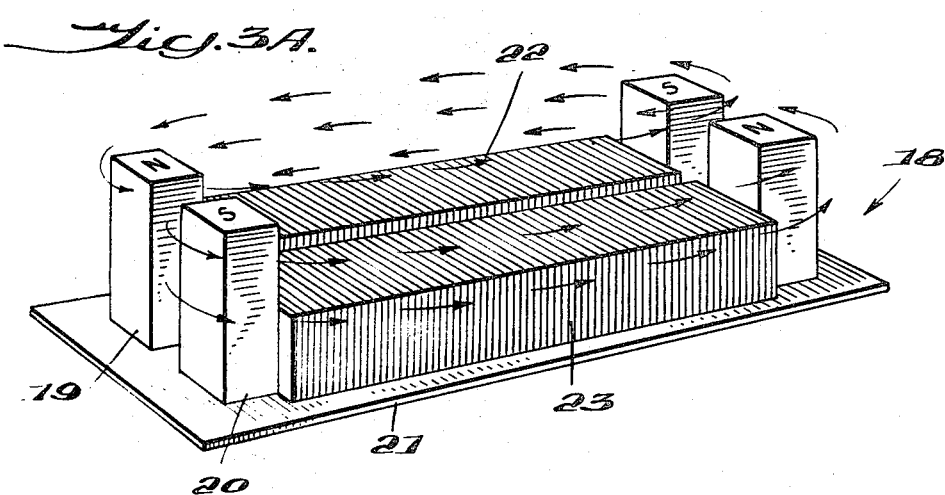
INVENTOR
EMMANUEL M. TRIKILIS,
By Pennie Edmonds Morton Taylor and Adams
ATTORNEYS Dec. 24, 1968   E. M. TRIKILIS   3,418,613
METHOD OF MAGNETIZING A LARGE QUANTITY OF BULK ARTICLES
Filed March 2, 1966   3 Sheets-Sheet 2

INVENTOR
EMMANUEL M. TRIKILIS,

By Pennie Edmonds Morton Taylor & Adams
ATTORNEYS

Dec. 24, 1968  E. M. TRIKILIS  3,418,613
METHOD OF MAGNETIZING A LARGE QUANTITY OF BULK ARTICLES
Filed March 2, 1966  3 Sheets-Sheet 3

INVENTOR
EMMANUEL M. TRIKILIS,

ATTORNEYS

United States Patent Office 3,418,613
Patented Dec. 24, 1968

3,418,613
METHOD OF MAGNETIZING A LARGE
QUANTITY OF BULK ARTICLES
Emmanuel M. Trikilis, Lincoln Le Veque Tower,
Columbus, Ohio 43215
Filed Mar. 2, 1966, Ser. No. 531,253
1 Claim. (Cl. 335—284)

ABSTRACT OF THE DISCLOSURE

A method of magnetizing a large quantity of bulk articles for use in a pilferage prevention system comprising the passing of the articles through at least two magnetic fields having their polarity arranged in different directions. An article to be protected from pilferage by means of a magnetic-detecting system, said article carrying a plurality of magnetic fields wherein at least two of said fields are disposed in opposite directions.

---

This invention relates to magnetic devices and more particularly to magnetized articles for use in systems to prevent pilferage. This invention further relates to a method of magnetizing such articles.

The problem of pilferage by customers, employees, borrowers and others has reached an alarming level. Various radioactive and electronic systems have been designed to protect articles from unauthorized removal. However, each has attendant disadvantages. The radioactive systems present problems in handling and the electronic systems are costly to install and maintain. In my copending application, Ser. No. 412,893, for System and Method for Preventing Pilferage by Detection of Magnetic Fields, filed Nov. 23, 1964, now Patent No. 3,292,080, a system was described in which articles such as goods or commodities, easily accessible to the public, are protected by being given a detectable magnetic field which must be demagnetized by authorized personnel before it may be removed from a security area. A magnetic sensing device is placed at the exit or doorway to detect any articles which have not been exposed to the demagnetizer.

The system operates satisfactorily with any article having a detectable magnetic field. Therefore, the article need only have a single detectable magnetic field to operate satisfactorily with the pilferage prevention system described above.

However, one disadvantage of using only a single detectable magnetic field is that the system may be defeated by neutralizing the single magnetic field of the protected article by an external magnetic source. This may be accomplished by placing another device of the same magnetic strength having an opposed polarity immediately adjacent to the protected and magnetized article. One magnetic field then acts to neutralize the other in the same manner as that occurs when two bar magnets are placed side by side with poles directly opposite. Thus, it can be seen that if such were to occur, the removal of the articles by an unauthorized person in the aforementioned system would not be detected.

The present invention relates to magnetized articles suitable for use in pilferage prevention systems and to a method of magnetizing the articles to be used in said systems.

The magnetized articles are not limited to any particular shape and may be rectangular, circular or have any three dimensional configuration, as long as they are capable of retaining a detectable magnetic field. The magnetized articles may be the goods to be protected themselves where they are capable of retaining a detectable magnetic field or they may take a form so as to be readily attachable to the goods or products to be protected.

One feature of the present invention is that the articles to be protected are capable of retaining a plurality of magnetic fields so as not to be subject to neutralization by an external magnetic source. This is accomplished by individually magnetizing these articles themselves to provide at least two separate detectable fields where they are in the form of goods or commodities, or by attaching to the goods, an article in the form of a magnetic flat component having at least two separate magnetic fields. Whether the articles are in the form of magnetized commodities or are in the form of the flat magnetized components, no matter what type of external neutralizing sources are used, only one of the two magnetic fields will be neutralized since each article has two oppositely disposed magnetic fields.

A further feature of this invention is the method of magnetizing the articles. The article may be magnetized individually so a plurality of north-south magnetic fields may be produced as described above, or the articles may be magnetized in bulk, wherein only a single magnetic field is applied to the individual article.

A more complete appreciation of the invention and many of the attendant advantages thereof will be readily appreciated as the same becomes better understood by reference to the following detailed description when considered in connection with the accompanying drawings wherein:

FIG. 1a is illustrates one embodiment of a magnetizer used in the invention;

FIGS. 1b and 1c illustrate two rectangular magnetized components having a magnetic field produced by the magnetizer of FIG. 1a;

FIG. 2a illustrates a second embodiment of a magnetizer used in the invention;

FIG. 2b illustrates a magnetized article made with the magnetizer of FIG. 2a;

FIG. 3a shows a third embodiment of a magnetizer used in the invention;

FIGS. 3b and 3c show magnetized articles made with the magnetizer of FIG. 3a;

Figure 5A:
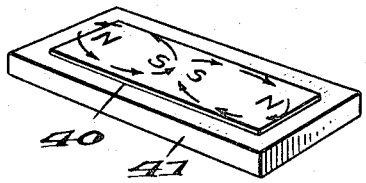
FIG. 5a is a commodity protected with an article of the present invention.
Figure 5B:
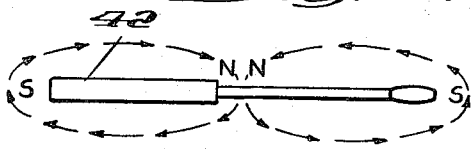
FIGS. 5b and 5c show magnetized commodities.
Figure 5C:
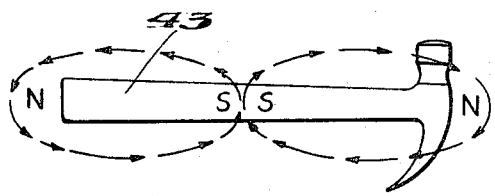

Various embodiments of the magnetized article to be used are shown in the drawings. There is no limitation on the size or shape of the article, and it need only have the property of residual magnetic induction, that is, it must be capable of retaining a detectable magnetic field. An example of such material is one with ferromagnetic properties. As indicated in my copending application, Ser. No. 412,893 for System and Method for Preventing Pilferage by Detection of Magnetic Fields, filed Nov. 23, 1964, now Patent No. 3,292,080, the magnetized article may be the protected goods themselves where they are capable of retaining a magnetic field, for example, an iron hammer or screwdriver, or the article may take the form of a flat component that is physically attached to the goods to be protected such as a flat metallic strip as shown in FIGS. 5a, 5b and 5c. To facilitate the description, the articles shown in the drawings are flat strip and circular components of the type that could be easily attached to goods or commodities to be protected.

FIG. 1a discloses a double-headed magnetizer 1 designed to produce the magnetic articles of the present invention. The double-headed magnetizer 1 is provided with a base 2 whereon two conventional C shaped yokes 3 and 4 are mounted in a longitudinal arrangement, the open ends facing upwardly. Around the base of each yoke 3 and 4 is wound a coil 5 and 6 designed to carry the magnetic current. The coils 5 and 6 are wound in such a manner that magnetic fields of opposite polarity are produced when current is passed through them. In this embodiment the south poles are shown adjacent each other while their respective north poles are on the opposite end of the magnetizer unit 1.

Figure 1B:
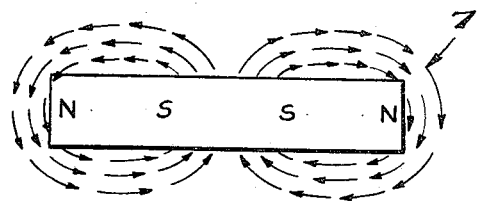

It will be understood by those skilled in the art that an article capable of retaining a residual magnetic induction may be magnetized by placing it directly over the open ends of the yoke pieces 3 and 4 and energizing the coils 5 and 6. The energized coils 5 and 6 produce magnetic flux fields between the two north and south poles which act to reorient the molecular structure of the magnetizable article. The article, such as the flat strip component 7 shown in FIG. 1b, is provided with a pair of north-south magnetic fields, with the two south poles at its respective center and north poles at its ends. A non-magnetic material may be placed at the center of the article 7 between the two magnetic fields in any convenient manner to act as a means for definitely separating the two fields.

Alternately, a strip component 8 may be formed by two pieces of magnetized material 9 and 10 set in a nonmagnetic material 11 such as plastic or cardboard to form a composite structure. This strip component 8 may be formed by first separately magnetizing the individual pieces of material and then setting them in the plastic or cardboard, or by setting the individual pieces in the plastic or cardboard and utilizing the magnetizer 1 as above.

With this arrangement of double magnetic fields in the component, the problem of neutralizing the magnetized component is almost totally eliminated, since a neutralizing magnet having one magnetic field cannot be placed over both the magnetic fields of the article and one or the other will remain detectable.

Figure 2B:
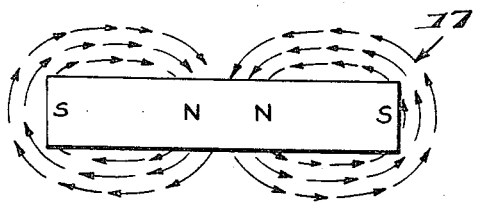
Figure 1C:
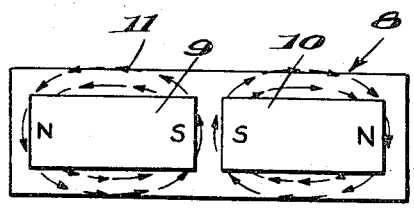

FIG. 2a shows a double-headed magnetizer 12 similar to the magnetizer 1, except the coils 13 and 14 wound around the yokes 15 and 16 produce an opposite polarity to the magnetizer 1. In this way, the north poles are adjacent to each other while the south poles are on the opposite end of the magnetizer unit 12. The strip component 17 shown in FIG. 2b formed by this double-headed magnetizer 12 thus has a polarity opposite to the strip component 7 of the first embodiment.

A non-magnetic material may also be placed between the two magnetic fields. Also, a strip component may be formed by two pieces of magnetized material set in non-magnetic material, to form a composite structure in the same manner as component 8 of the first embodiment.

FIG. 3a shows a third type of double-headed magnetizer 18 wherein two C shaped yokes 19 and 20 are placed on a base 21 facing upwardly in a parallel, side-by-side relationship rather than in a longitudinal line as illustrated in FIG. 1a and FIG. 2a. The coils 22 and 23 are wound around the bases of their respective yokes 19 and 20 in such a way so as to produce magnetic fields of opposite polarity when the current is passed through the coils. That is, one yoke of the magnetizer 18 has a north-south polarity while the other yoke immediately adjacent thereto has a south-north polarity.

Figure 3B:
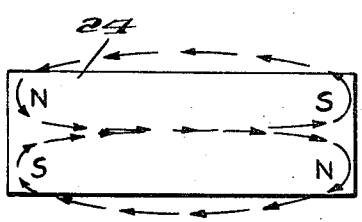
Figure 3C:
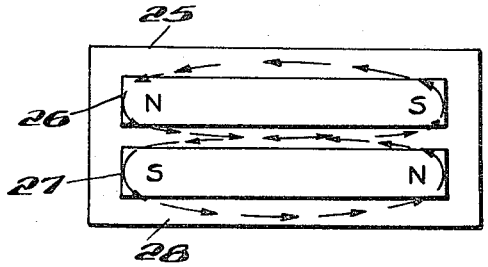

FIG. 3b illustrates a magnetized strip component 24 produced by the magnetizer 18. In this figure the two detectable magnetic fields are arranged in parallel, side-by-side relationship to form the double polarity magnetized strip component 24.

As in the first two embodiments, the strip component 24 may be provided with a strip of nonmagnetic material between the two fields. Alternately, a strip component article 25 may be formed using two pieces of magnetized material 26 and 27 of opposite setting on a nonmagnetic base 28.

A variety of magnetizers and components are contemplated by this invention, the only limitation being that the magnetizer carry at least two magnetic yokes of opposite polarity to provide the component with two magnetic fields in order that both fields will not be subject to neutralization from an external magnetic source.

Figure 4A:
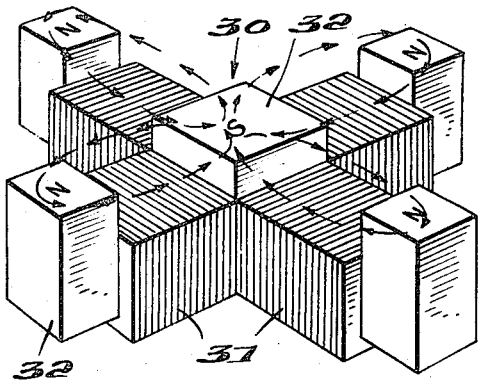
FIGS. 4a and 4b illustrate two additional types of magnetizers.

FIG. 4a shows a cross-shaped magnetizer 30 capable of producing four magnetic fields. The coils 31 are so wound on the yoke section 32 so as to produce a south polarity at the center of the magnetizer 30 and north polarities at the end of the magnetizer yokes. Thus, by placing any article to be magnetized above or in juxta-position with the magnetizer 30, it will receive four magnetic fields extending radially outwardly from the center of the magnetizer.

Figure 4B:
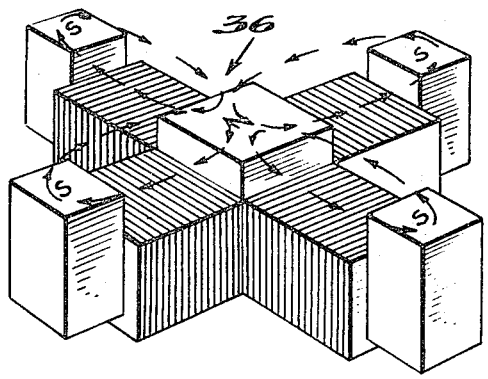
Figure 4C:
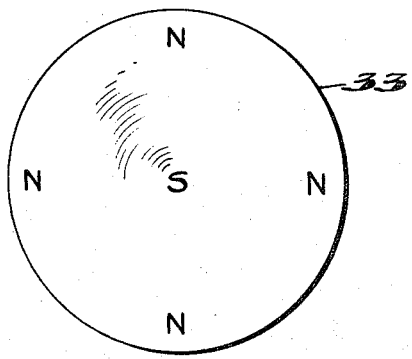
FIGS. 4c and 4d illustrate the magnetized articles made with the type of magnetizers of FIGS. 4a and 4b.
Figure 4D:
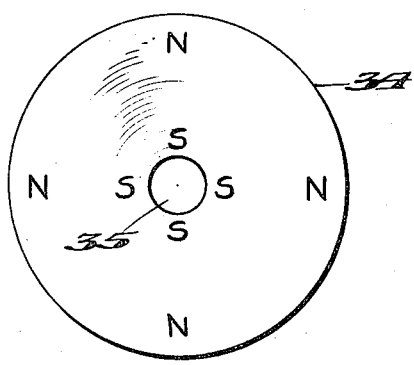

This type magnetizer 30 is particularly convenient for use in producing circular magnetized components 33 and 34 as shown in FIGS. 4c and 4d. The same principle applies to the circular components 33 and 34 as to the longitudinal strip components described above. The opposite polarity arrangement of the detectable magnetic fields precludes neutralization by an external magnetic source. To facilitate handling, a circular component 34 may be provided with a hole 35 in its center.

It is understood that this type magnetizer may have its coils wound in such a manner so the current flows in the opposite direction in order that the center of the magnetizer forms a north pole and the opposite ends form south poles. This type of magnetizer 36 is shown in FIG. 4b. The operation is the same as described above, with merely a change in polarity. The article to be detected is given a plurality of radially spaced magnetic fields which are not subject to neutralization from an external source.

As indicated above the article to be magnetized is not limited to any particular size or configuration. FIG. 5a illustrates a magnetized component type article 40 which is shown attached to the goods or commodity 41 such as a library book or the like. It is understood this attachment may be made in any convenient manner such as by using glue or pressure-sensitive tape. Also, any goods or commodities which are to be protected, and are capable of retaining a detectable magnetic field, may be directly magnetized with a plurality of magnetic fields. For example, metallic tools or appliances could be given a plurality of detectable magnetic fields. FIG. 5b illustrates a screwdriver 42 and FIG. 5c illustrates a hammer 43 both of which have been magnetized according to this invention. Such goods could be magnetized by a longitudinal magnetizer 1, 12 or 18. Differently shaped commodities, such as a frying pan, not shown, could be magnetized by a cross-shaped magnetizer 30 or 36. The type of magnetizer used depends upon which is the more convenient to use.

Where an article to be protected is made in great quantity, it may not be economically feasible to individually magnetize each article in order to provide it with a plurality of magnetic fields.

The detection system of my copending application, Ser. No. 412,893, for System and Method for Preventing Pilferage by Detection of Magnetic Fields, filed Nov. 23, 1964, operates in the same manner whether the articles or goods to be protected have a single or a plurality of magnetic fields. Thus, it may be economically preferable to magnetize the articles in bulk thereby giving them only a single detectable field. In order that that pilferage prevention system operates more efficiently, the articles or goods to be protected need be magnetized along their longitudinal axis, which produces a stronger magnetic field. A method of bulk magnetizing the articles in such a manner is described below.

Figure 6:
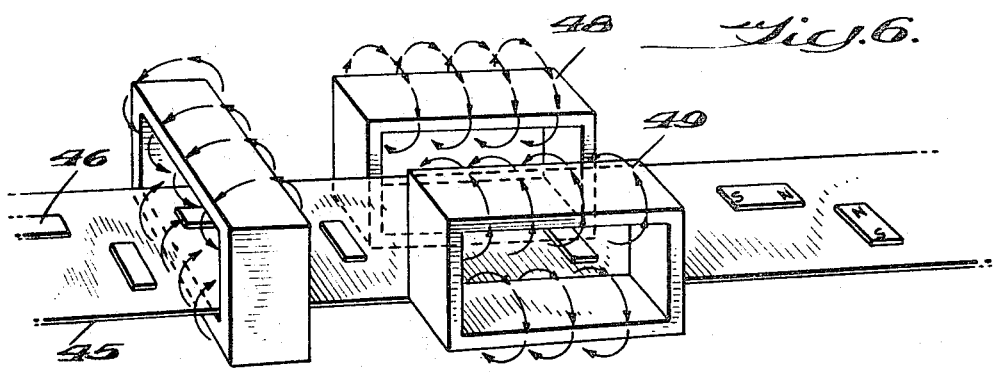
FIG. 6 shows apparatus used in the method of magnetizing materials in bulk.

FIG. 6 shows an apparatus for magnetizing such articles in bulk. A conveyor 45 carries the articles 46, which are to be magnetized, arranged in random position on the belt 45. A magnetizer 47 is constructed so as to allow the articles to pass through its center and it is wound to produce a magnetizing force field parallel to the direction of movement of the articles. Two other magnetizers 48 and 49 are placed adjacent to the conveyor 45 and are wound to produce a magnetic force field perpendicular to the direction of movement of the articles 46 on the conveyor 45.

To facilitate detection, it is desirable that the articles 46 be magnetized along their longitudinal axis. When the article to be magnetized passes the magnetizer units 47, 48 and 49, it will be substantially parallel to either the magnetic force field produced by magnetizer unit 47 or the field produced by the magnetizer units 48 and 49. It has been found there is little magnetic strength in any field produced across the width of the magnetized articles 46. Thus, an article which is magnetized by passing through a parallel force field is not neutralized by passing through a second magnetic force field perpendicular to it since only the width is exposed to this second field. If the articles 46 are to be magnetized in the form of the goods or commodities to be protected, they will be normally packaged in such a way so as to be perpendicular to the magnetizer unit 47 or perpendicular to the units 48 and 49. If the article is not packaged but is lying loosely on the conveyor, the magnetic field produced by the magnetizer units will have a tendency to align the articles 46 passing by. In both cases the articles 46 are magnetized along their longitudinal axes.

Obviously, numerous modifications and variations of the present invention are possible in light of the above teachings. It is therefore to be understood that within the scope of the appended claim, the invention may be practiced otherwise than as specifically described herein.

I claim:
1. A method of magnetizing a large quantity of bulk articles to be used with a pilferage prevention system comprising the steps of passing a quantity of bulk articles to be magnetized through a first magnetic flux field positioned perpendicular to the direction of movement of said articles thereby magnetizing said articles passing through said first field with a polarity in a first direction; passing the said quantity of bulk articles through a second magnetic flux field positioned parallel to the direction of movement of said articles thereby magnetizing said materials passing through said second field with a polarity in a second direction, whereby each of the individual articles will become magnetized.

References Cited

UNITED STATES PATENTS

| | | | |
|---|---|---|---|
| 2,827,437 | 3/1958 | Rathenali | 335—284 XR |
| 2,981,871 | 4/1961 | Westmijze | 335—302 |
| 3,150,296 | 9/1964 | McIntosh | 335—303 XR |
| 3,177,546 | 4/1965 | Bey | 335—302 XR |
| 3,191,106 | 6/1965 | Baermann | 335—303 XR |

GEORGE HARRIS, *Primary Examiner.*

U.S. Cl. X.R.
335—302